Dec. 1, 1925.
J. F. WILSON
1,563,415
CAR HEADLIGHT ANTIDAZZLE DEVICE
Filed July 23, 1924
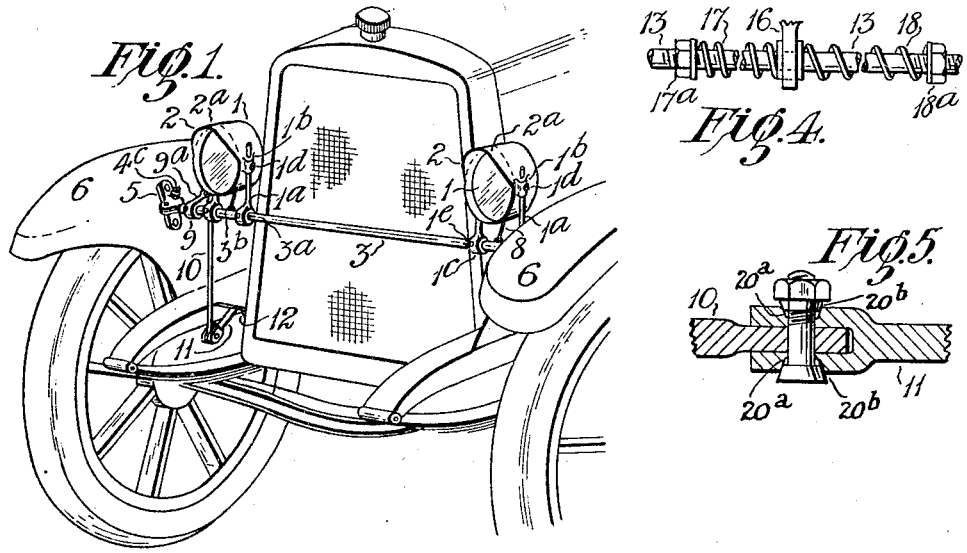
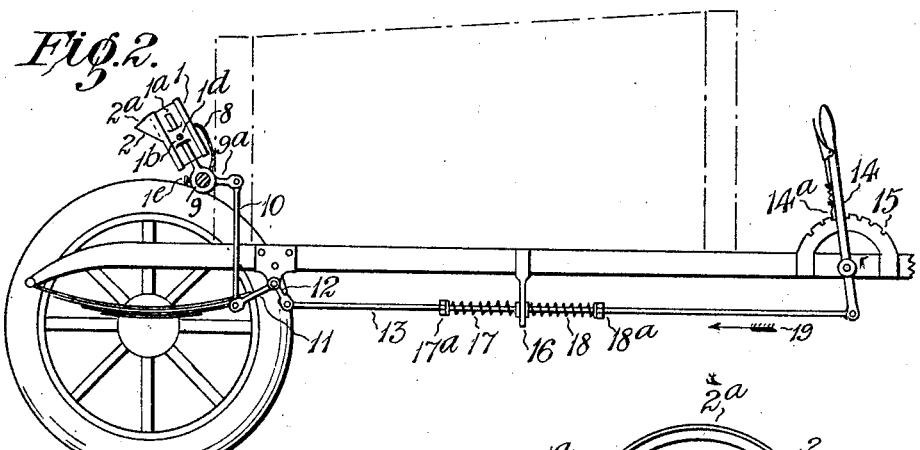
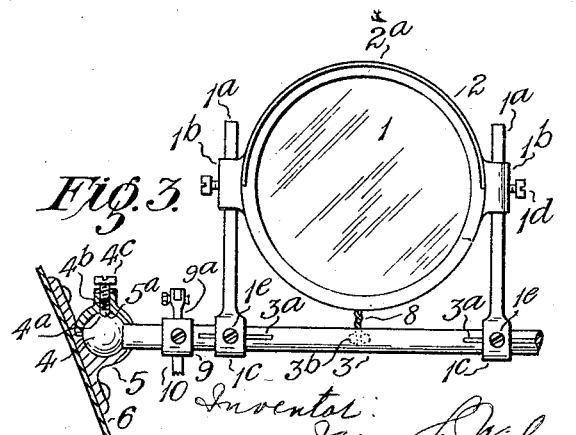
Inventor:
James F. Wilson
By: Fetherstonhaugh & Co.

Patented Dec. 1, 1925.

1,563,415

UNITED STATES PATENT OFFICE.

JAMES FREDERICK WILSON, OF SHEPPARTON, VICTORIA, AUSTRALIA.

CAR-HEADLIGHT ANTIDAZZLE DEVICE.

Application filed July 23, 1924. Serial No. 727,748.

*To all whom it may concern:*

Be it known that I, JAMES FREDERICK WILSON, a subject of the King of Great Britain and Ireland, residing at Knight Street, Shepparton, in the State of Victoria, Commonwealth of Australia, have invented certain new and useful Improvements in Car-Headlight Antidazzle Devices; and I do hereby declare the following to be a full, clear, and exact description of the invention, such as will enable others skilled in the art to which it appertains to make and use the same.

My invention relates to mechanism to be operated by a driver of a motor vehicle during travel, and by which he will swing a pair of electric headlights forwardly and downwardly from a normal position at any moment desired until the most upwardly directed light beams from the lamps bear on a predetermined length of road for a less distance ahead of the car than normally, and cannot then dazzle persons in front.

The lamps may be fastened in adjusted position, and can be returned to normal by the driver when desired. There exist headlamps which do not glare, some because of special construction which include dimmers; some because they are normally set low; and some headlamps have been proposed each having pivoting means at their tops or sides, but such pivoting means have not proved satisfactory.

My construction enables ordinary bright headlights to be used, without low setting or individual pivoting. Motor car drivers find there are advantages in headlamps which are not set low, and which are not such that the light is dimmed, but owing to regulations, they are obliged to employ some provision against glare; and my invention is specially useful in their cases. Further, when a pedestrian in the foreground is not deterred by glare, and can see the road illuminated in front of a car, he will be able to correctly note the car's position and movements. I do not use ordinary dimming means, but in some cases I employ on the headlamps means to act as masks at the time when the driver begins to swing the headlamps bodily forwardly and downwardly (as hereinafter set forth) in an arc around a transverse axis which is located below the headlamps by means of a lamp suporting bar which is thus separate from the lamp. The driver can operate the mechanism to swing the headlights at whatever speed, and along whatever arc suits him. The swinging movement need only be slight if the said masking suffices.

By swinging the headlamps forwardly, their light rays become lowered below the normal lines of emission, reduction of glare being at once effected, followed by a complete cutting off of the rays from the road in the distance to the extent the driver wishes. But strong light will still be projected upon the road by the lamps for a reduced distance ahead of the car, and will promote safety and comfort. This light will not be wasted upon mud guards, as would be the case on some cars if the lamps were not swung bodily forward. I provide means to guard the headlights against undesirable displacements.

I will now explain an application of my invention to two headlamps connected in any ordinary manner to a cross bar at a car front.

In the drawings herewith in which the scales vary:—

Figure 1 is a perspective view of a motor car front showing headlamps, their supports and part of the actuating mechanism.

Figure 2 is a diagrammatic side sectional view, omitting the mudguard, and the bearing of the transverse or axial bar.

Figure 3 is a front view of a lamp and a support.

Figure 4 shows control rod details.

Figure 5 is a sectional view of a joint.

For preliminary masking, in some cases I provide on the upper part of each lamp 1 a hood 2 which projects suitably forward, and has a translucent or masking area $2^a$. When the headlights are swung forwardly and downwardly, the immediate effect will be that the hoods cut off the powerful uppermost forwardly extending rays of light so that they will not dazzle persons in front.

The headlamps have supports as pillars $1^a$ of any suitable length, held in lamp sockets $1^b$, which are located at any suitable height as by set screws $1^d$. Many headlamps now in use have short central pillars, and I may use such. Ordinary pillars are fixed to a transverse bar which is not rotatable. My pillars are mounted on, and may be slidable along, the transverse bar 3 having, to allow of this, eyes $1^c$ secured as by set screws $1^e$ each entering a recess in the bar, to prevent rotary movement of the pillars relatively to the bar. Recesses may be provided by grooves 3ᵃ.

I support the bar 3 rotatably in bearings 5 on a suitable base, as a mudguard 6. Each end of bar 3 is rounded, being shown as a ball 4, and is under pressure produced by adjusting member 5ᵃ shown as a pin in the bearing so that its end presses the ball.

The pin is shown entering a recess 4ᵃ in the ball. The pin is depressed by a spring 4ᵇ which is compressed by a set screw 4ᶜ.

Electric conducting wires 8 extend to the lamp bulbs through suitable guides shown as eyes 3ᵇ on bar 3.

Attached to bar 3 is a clamp 9 having a projecting arm 9ᵃ coupled by a link 10 to a limb 11 of a lever, the other limb 12 of which is connected by a reciprocatable rod or rods 13 to a driver's lever 14 or the like which can be fixed in any adjusted position by a spring tooth 14ᵃ engaging a rack 15.

The reciprocatable rod 13, which may be in parts connected by a turnbuckle to regulate the length, as any mechanic will know, passes through a guide 16 which acts as an abutment, against which ends of springs 17, 18 bear in opposition to one another, coiled springs being preferred. The other end of each spring bears on a stop on the rod. The stops may be adjustable nuts 17ᵃ, 18ᵃ, to regulate the spring pressure. The purpose of these springs is to cause the rod 13 to be mostly pressed in predetermined directions which vary according to whether the rod is in normal position, or has been moved out of normal position. In the former case the spring 17 is under greater compression, or has more power than spring 18 so that when lever 14 frees rod 13 for movement as per arrow 19 the spring 17 assists this movement, therefore assisting the lamps to swing forwardly.

At about the position of Figure 2 the spring pressures will be in equilibrium or approximately so. But if the lamps be swung farther downward the spring 18 becomes the more powerful by being more highly compressed. Consequently when the catch of lever 14 is clear of the rack 15 the spring 18 helps the lever action in returning the lamps towards normal.

In Figure 5, I have shown my preferred joint between the levers and the connecting rods and for illustrative purposes have taken the joint between the rod 10 and the lever 11. The end of the rod 10 fits into the bifurcated end of the lever 11 and a bolt is passed through apertures formed in both ends. The apertures in the lever may be provided with tapered recesses 20ᵃ adapted to receive a tapered bolt head 20ᵇ and a tapered nut unit 20ᶜ, but while this construction is useful it is not essential.

I claim:—

A headlight supporting and tilting assemblage for automobiles comprising a pair of socket members attachable to the front fenders of an automobile, a shaft terminating in ball shaped extremities adapted to be received in said socket members, a pair of posts fixed to and projecting laterally from the shaft adjacent each end thereof, a headlight positioned between and carried by the posts of each pair, a crank arm fixed to the shaft adjacent one of said socket members, a bracket attachable to one of the side members of the chassis at a point below and rearwardly of said shaft, a bell-crank pivoted to said bracket, a link connecting one arm of the bell-crank to the arm on said shaft, a guide bracket attachable to the aforementioned side member of the chassis rearwardly of the first mentioned bracket, a rod slidable through said guide bracket and attached at one end to the other arm of the bell-crank, abutments carried by the rod at opposite sides of the guide bracket, springs confined between opposite sides of the guide bracket and said abutment and an operating element connected with said rod for imparting sliding movement thereto.

In witness whereof I have hereunto set my hand.

JAMES FREDERICK WILSON.